United States Patent [19]

Peterson

[11] 4,235,561
[45] Nov. 25, 1980

[54] SUBTERRANEAN IRRIGATION MEANS AND SYSTEM

[76] Inventor: Glen Peterson, 540 S. 83rd E. Ave., Tulsa, Okla. 74112

[21] Appl. No.: 11,686

[22] Filed: Feb. 12, 1979

Related U.S. Application Data

[63] Continuation-in-part of Ser. No. 687,891, May 19, 1976, abandoned.

[51] Int. Cl.³ .............................................. E02B 13/00
[52] U.S. Cl. ...................................... 405/45; 47/48.5
[58] Field of Search ................ 239/145, 542; 47/48.5; 405/45–47

[56] References Cited

U.S. PATENT DOCUMENTS

| | | | |
|---|---|---|---|
| 3,407,608 | 10/1968 | Whitehead | 405/37 |
| 3,518,831 | 7/1970 | Tibbals et al. | 47/48.5 X |
| 3,552,654 | 1/1971 | Thomas | 239/145 |

Primary Examiner—Robert E. Bagwill

[57] ABSTRACT

A porous, or semi-permeable, pipe is placed below the surface of the soil in the area to be irrigated and a flow of water maintained therein. This avoids such practices as sprinkling, furrowing or ditching, and subsequent cultivation, and thereby permits the surface of the land being irrigated to be continuously maintained in the condition most conducive to vegetation growing thereon. It also greatly avoids excessive loss of water by evaporation, puts the water in that position in the soil where it is most useful, and obviates the necessity of having the land level, or nearly so, as required by the more usual methods of gravity-flow irrigation. A steeply sloping hillside can be irrigated quite as easily as a flat plain. Mathematical relations are developed to optimize physical dimensions and flow properties as a function of applied pressure.

5 Claims, 3 Drawing Figures

SUBTERRANEAN IRRIGATION MEANS AND SYSTEM

CROSS REFERENCE TO RELATED APPLICATIONS

This invention is concered with supplying necessary water to plants growing in places where there is insufficient rainfall to support plant life over all, or portions of, each growing season. It is a continuation-in-part of my co-pending U.S. patent application, Ser. No. 687,891, filed May 19, 1976, now abandoned because of alleged inadequate disclosure in the original application. This application provides the disclosure alleged to be missing.

BACKGROUND OF THE INVENTION

Irrigation has been practiced in one form or another for a great many years. The average home owner has a lawn, some trees and shrubs, and perhaps a garden, and in those areas where the annual rainfall is insufficient to maintain vegetation, he is obliged to provide some form of irrigation. This is usually accomplished by means of a portable water hose attached to the city water lines, which convey the water to the point of useage, and a sprinkler system, spraying nozzle, or other outlet which distributes the water over an area. Usually it is necessary to move the water hose and distributing outlets about, quite frequently, in order to cover an area of any size.

Another form of irrigation system that is frequently used in maintaining large lawns is a network of fixed sprinkling or spraying outlets which are connected to the water supply by means of underground pipe. This form of irrigation, as all similar ones presently in use, sprays the water over the surface and wastes a good part of it on plant foliage, improper distribution and subsequent evaporation.

Still another form of large-scale irrigation that is used in arid, or semi-arid climates, where agricultural crops are raised for profit, is that of the canal, ditch, furrow and dike. Permanent canals convey the water from the storage dam to the land being irrigated and a system of ditches and furrows adjoining the canal distributes the water over the surface and thence to the crop being raised. Alternatively, the area is divided by a system of dikes which allows an entire area to be flooded.

To avoid excessive loss of water by evaporation where row crops are raised, the system of irrigating furrows is usually destroyed a day or two after irrigation and the surface between rows cultivated; i.e., pulverized to inhibit the flow of water between earth particles adjacent the surface and whence the evaporation. A few days following this, depending upon the climate, the area must again be furrowed, and following this, again irrigated, and the foregoing sequence of events repeated every week or ten days throughout the growing season.

Today, as one travels about farming areas, one sees many overhead sprinkling systems used to irrigate large fields. This type of sprinkling system operates under relatively high water pressures so that a rotating spray from each nozzle covers many square yards of surface; nevertheless, such systems must be moved about considerably to cover an entire acreage that is under cultivation, as well as get the pipe and sprinklers out of the way for other farming operations.

There are, quite naturally, many problems relating to the supply and distribution of water for irrigation. As the population grows throughout the world at a quite rapid rate, the water storage and distribution systems of most municipal supplies usually get overtaxed during the summer months. Quite often, it becomes necessary for municipal services to ration the water or even prohibit its use for irrigation altogether so that water will be available for other more essential services.

Again, the amount of water that can be made available for large scale agriculture depends both upon the rainfall and storage facilities, and these things, in turn, limit the amount of land that can be cultivated in any particular place. Another factor limiting the amount of land available for agriculture is that of topography, and the only lands which can today be irrigated, except for the overhead sprinkling system, are those which are level, or at least nearly level, with gravity controlling the distribution of water during irrigation.

DESCRIPTION OF THE PRIOR ART

Pipes of one kind or another have been used for many years in transporting water from one place to another. Such pipes have been formed from wood, ceramics, metals, and more recently of plastics. Wooden pipes, no longer used except in primitive civilizations, were usually coated with tar and similar substances to keep them from rotting. Similarly, steel pipes are usually plated or wrapped with materials to prevent rust and corrosion. One big advantage of plastics, in addition to cost, is that they are not susceptable to corrosion by elements found in air or soil, nor from destruction by bacteria and other parasites. They are free from destruction when buried in the earth or even when disposed in a garbage dump.

The technology relating to the production of plastic substances such as polyethelyne, polystyrene, polyvinyl chloride, polyurethane, etc., has been developed to the point where these materials can be selectively used to form flexible and rigid pipe, flexible and rigid foams, as well as permeable and semipermeable membranes. Analagously, the art relating to porous ceramics, which has been with us a long time, has been developed to the extent that porosities and permeabilities can be precisely controlled. Until the present time, porous and permeable ceramics and plastics have been used primarily for filtering purposes in chemical industries, cigarettes, aquariums and related applications. Such materials are also used as separators in electric storage batteries. As will be shown, an even larger application than any, or all, or these is made possible by this invention.

As noted, the plastic materials most often used to form pipes or tubes are polyethelyne, polystyrene, polyvinyl chloride and polyurethane, and all of these can also be foamed and formed into permeable and semipermeable membranes and bodies. The art of making semi-permeable membranes is quite highly developed as exemplified by U.S. Pat. Nos. 3,332,894; 3,412,184; 3,439,075; 3,339,153; 3,483,282; 3,486,946; 3,494,780; 3,551,331; etc. Similarly, the art of making porous filters is highly developed as exemplified by U.S. Pat. Nos. 3,253,967; 3,006,346; 3,039,908; 3,067,147; etc. These materials are used as separators in storage batteries, as cigarette filters, in the selective separation of gases and liquids by osmosis and reverse osmosis, in the separation of liquids and solids by filtration as in desalination of salt water, the filtration of fresh water supplies, and in the removal of solids from decomposed sewage, etc.

The general procedure in making porous plastics and permeable materials is that of occluding or incorporating into the plastic void-forming or void-producing elements or ingredients and randomly distributing these throughout the plastic. Usually, the void-forming or void-producing elements or ingredients are chemicals which react with each other to produce gases, and/or which at slightly elevated temperatures produce gases. The shape and size of the pores as well as their contiguity can generally be controlled through the choice of materials, temperatures and pressures. The pores can be made open and permeable, as in filters and sponges, or they can be made closed as in insulating and packaging materials. Again, foams can be formed which are rigid, or flexible, depending upon the combination of materials used and the requirements.

SUMMARY OF THE INVENTION

In the present invention, combined use is made of the foregoing properties of plastics and ceramics to provide a controllable subterranean irrigation system. While other means than permeable, or semi-permeable barriers might be provided for the even distribution of water in an irrigation system, such as a finite number of small holes or openings in an otherwise closed pipe, the permeable barrier has a number of distinct advantages among which are:

1. When water is distributed by means of a system having a finite number of small holes, or openings, it is extremely difficult to make all of the holes, or openings, the same size; consequently, more water will go out one hole than another so that one volume of soil gets too much water while another gets too little. When a permeable, or semi-permeable barrier is employed to distribute the water we don't have this problem. The openings, while enormously small, are so great in number that the distribution pretty well balances out and becomes uniform along the entire pipe.

2. The normal flow of water through the soil, through the rootlets, roots and stems of plants (transpiration) is similar physically to the flow through a permeable or semi-permeable membrane. The forces of surface tension, adhesion, cohesion, osmosis, etc., all come into play; accordingly, the irrigation system of this invention applies the same physical principles in distributing the water as are applied by nature in the flow and distribution of water in the soil, through the roots and up the stems of plants and thence to the laves from which a certain percentage of the water is evaporated by the sun to maintain the osmotic pressure within the plant. This compatability of physical forces naturally results in the flow of water from the pipe in accordance with the requirements of the plants being supported by the irrigation system and, consequently, in a great economy of water. It also permits of a controlled flow of irrigation water through an automatic adjustment of water pressure in the permeable pipe.

3. With existing irrigation systems, the plants usually get too much water on the day of irrigation and far too little on the day preceding irrigation. Irrigation, as generally practiced today, whether on the large-scale farm or at the small residence, is a continuing cycle of over-indulgence and dire thirst. Plant life thrives best when provided with a continuing supply of exactly the right amount of water. The tropics where it rains every day is a good example of this. Plant pests and diseases can also better be kept under control when a continuing supply of the right amount of moisture to the root system is provided while the surface of the soil is kept nearly dust dry.

4. The amount of water wasted through excessive evaporation will be considerably less because an excessive amount of water is never applied and far less of it reaches the surface of the soil from whence it evaporates. With this system of irrigation, the surface of the soil where row crops are raised can be maintained in a continuously cultivated or finely pulverized state which greatly reduces evaporation. Alternatively, the soil can be continuously mulched.

5. If the subterranean water distribution system uses holes or other relatively large openings, as compared with the openings in a permeable, or semi-permeable, barrier, plant roots will grow into them, enlarge on the inside, and possibly fill the pipe. The openings in a permeable, or semi-permeable, barrier which are adjusted to pass the relatively small water molecule, $H_2O$, are far too small to permit passage of the relatively much larger molecules of a plant root and hence the root itself. Even if the permeable plastic distribution pipe becomes completely surrounded and enclosed on the outside by a dense network of roots, the flow of water from the permeable pipe will not be shut off as long as the roots remain outside the pipe.

6. When the porous, or permeable, piper internal flow cross-section is large compared with the external flow cross-section through the walls of the pipe, a constant pressure of water can be maintained in the pipe and hence a constant flow through the pipe into the soil regardless of the slope of the pipe or the land in which the pipe is buried. Thus, it is possible to irrigate hillsides and steeply sloping plains and valleys.

7. Irrigation can be accomplished at any hour, day and night, or it can be done continuously by suitably regulating the water pressure, as best meets the requirements of each situation.

8. Once a system has been installed, irrigation can be accomplished automatically without the necessity of expending a lot of manpower. As a matter of fact, with the utilization of a complete automatic system there is no place where manpower could be used.

The complete mechanism by means of which water is taken from the soil and ascends 100 or more feet to the top of a tree (350 feet in the instance of some California redwoods) against the force of gravity is not completely understood. Many theories have been advanced and perhaps the most tenable of these theories, and the one most accepted today, is that which depends upon the cohesive properties of water. While one of the most common and plentiful of substances upon the face of the earth, water is also one of the most unique, complicated and remarkable when all of its properties, and things it will do, are taken into full consideration. To be able to rise 350 feet in the air against the force of gravity, or even 10 feet, is no mean accomplishment. Yet most men have witnessed this accomplishment for thousands of years without paying too much attention to it.

As noted, the principle mechanism motivating the ascent of water in trees and plants is thought by physicists and botanists to depend upon the forces of cohesion of the water molecule. The cohesive forces between water molecules are very great indeed and have been experimentally measured as exceeding 300 atmospheres. It is these same forces which assist water to escape through the pores of a permeable pipe—openings that are at least a thousand times too small for a plant root to enter. While the thread-like water columns in the soil and in the pores of my permeable pipe may not be as tenacious as those of the plant, or tree, there nevertheless is provided by this invention a continuous water transport system from a water flow line to the tips of leaves. It should also be noted that any deficit of force which may exist in the porous portions of my distribution system, as compared with the transport system of the plants, may be compensated by the pressure which can be applied to the water in the interior portions of the pipe. Thus, if some plant roots attach themselves to the exterior of the porous pipe, as shown in FIG. 2, a continuous water transport system is provided by the method and means of this invention, irrespective of the part played by the soil. Under these circumstances, the soil could be composed of gravel, fine sand, or sawdust, providing certain plant nutrients are present in the gravel, etc., or are added to the water of the irrigation system.

Experimentally, I varified some of these facts over a period of 21 months during which time I raised a succession of tomato stems from one root system. Irrigation of this plant was provided by a small ceramic porous pot taken from a galvanic battery demonstration kit. This pot was approximately 1⅜ inches in outside diameter and 2¼ inches long and the neck was fitted to a 3-foot length of ¾ PVC pipe, and at the other extremity of this pipe a plastic reservoir of about 3 pint capacity was fitted. The porous pot was then centered inside a typical 6-inch diameter red-clay, non-porous flower pot; the latter was filled with earth and a tomato plant was planted therein. As the plant grew, the PVC pipe served also as a stake to support it. Two other tomato plants of the same size and variety were planted in redclay flower pots and irrigated in the usual manner. The three plants were placed in a south window and the first fruits harvested for Thanksgiving dinner, 1972. When the plants reached the top of their stakes, and the window, new stems were allowed to issue near the base of the plants and the old stems cut off. Each plant was fed with appropriate amounts of fertilizer by putting the same in a common one-gallon water jug. The only difference was in how the water was applied, the experimental plant through the porous pot irrigation system and the two control plants by pouring the water on top of the soil in which they were growing.

At first there was very little difference in the productivity of the three plants but as the seasons progressed the two control plants nearly succumbed from wilt and when the experiment was terminated, at the end of 21 months, the experimental plant had produced more fruit than the two control plants combined, was loaded with fruit at that time, while the control plants were all but dead. The experimental plant consumed a little more than a half-pint of water per day, average, and this was barely sufficient to sustain it during the hottest weather. In fact, it probably would have perished had I not kept it pretty well pruned of foliage during the hot months. This, of course, was no indication of the failure of this method of irrigation; it merely indicated that the porosity of the particular pot used delivered insufficient water under no more than a 3-foot head.

As noted, the experiment was terminated a little short of two years, not because the experimental plant was dead, but because the control plants were nearly so and mostly because I wanted to see what had happened to the root system of the experimental plant. Upon breaking the plant out of the pot, I found, as expected, that a mass of rootlets had fully enveloped the porous pot but none were found inside the pot.

During the summer of 1975, I made another test of my porous pot irrigation system—this time in the garden outside. The pots used in this experiment were ceramics 1 inch outside diameter, ¾ inch inside diameter, and 3 inches long. Twelve such were connected at 3-foot intervals, through a pressure regulating valve, to the domestic supply line. Tomato plants were planted as near as I could get them to the porous pots and stakes provided. Twelve control plants were also planted on each end of the twelve experimentally-irrigated plants, and these were irrigated in the usual way, once a week in moderate weather and twice a week during the hottest weather. The water pressure for the experimentally-irrigated plants was set at about 8 p.s.i., and no other water applied except when it rained.

The flow rate of this system was previously measured and for each porous pot found to be 1.4 fluid ounces per hour under a head of 8 p.s.i.

This test didn't mean anything until about the end of June because it rained a lot. But during July, August and September, there was very little rain and the experimental plants survived and produced a bounteous crop by means of the water obtained through the porous pots. The control plants did likewise and there was no observable difference in either the productivity of fruit or foliage that couldn't be attributed to individual differences. The test was terminated Sept. 23, 1975 by the bursting of one of the porous pots which opened the irrigation system. I let the plants go until after frost but when I dug them up some weeks later I found that none of the root systems had clustered around the pots. My conclusion is that the water supply having been more than adequate, the roots found no necessity in seeking out the source of supply. Summarizing, this experiment with twelve tomato plants demonstrated that a water flow through a porous pot at a rate of 1.4 fluid ounces per hour was more than sufficient to sustain tomato plants in climates like those in eastern Oklahoma during July, August and September of an average summer when there was very little rain.

DETAILED DESCRIPTION OF THE INVENTION

Figures 1, 2:
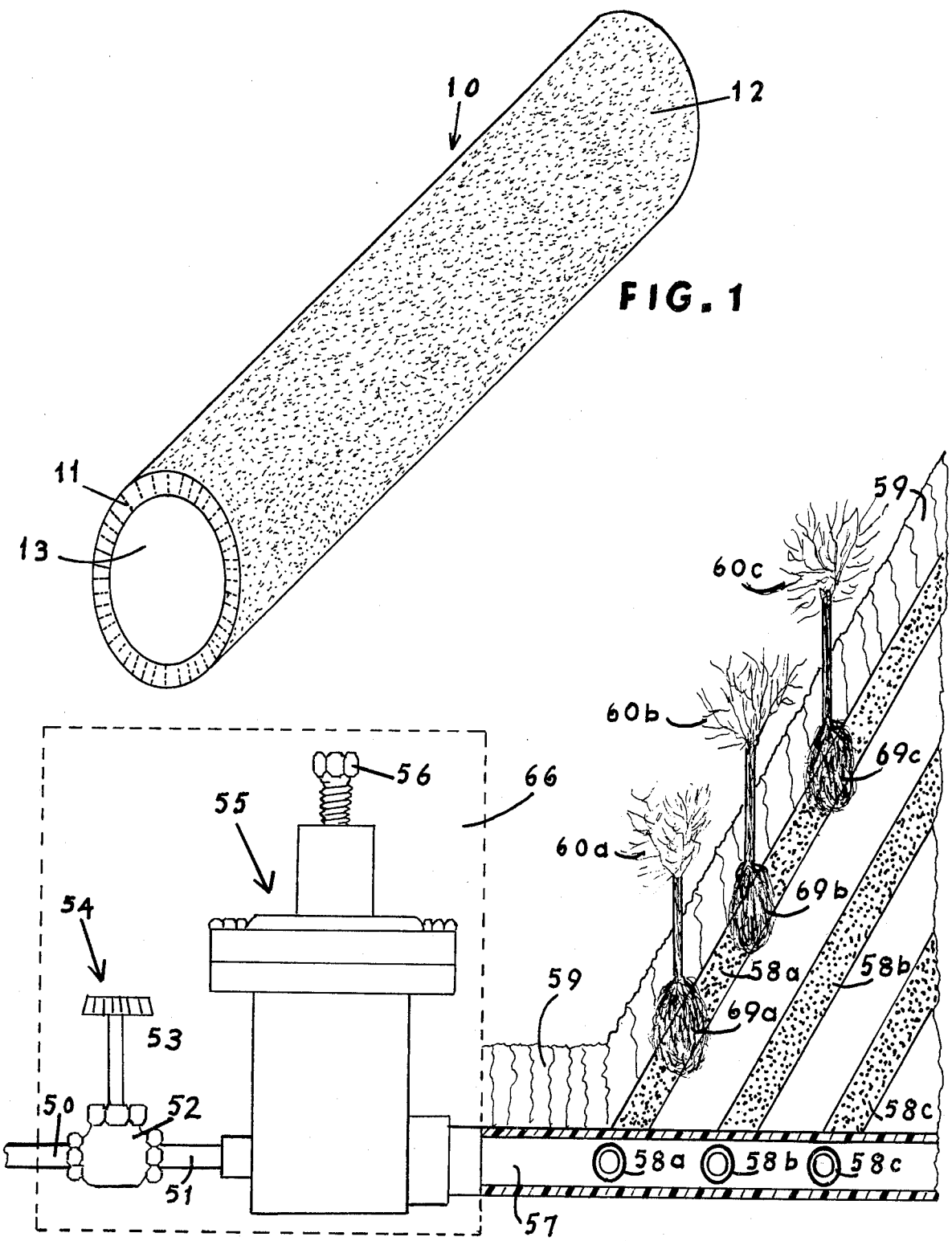
FIG. 1 is a perspective view of a section of seamless irrigation pipe having a uniform porosity throughout.
FIG. 2 is a schematic plan view, in partial cross-section, of a portion of a typical irrigation system of the present invention.

The preferred large-scale embodiment of the invention with respect to the construction of the distribution and dispensing pipe is shown in FIG. 1. The pipe 10 is preferably round in cross-section, has the smallest possible wall thickness 11 consistent with the strength and rigidity required to support some six inches of soil and the passage of heavy farm implements over the surface of the soil where the pipe is buried, and/or the internal pressure that is required to accomplish an even distribution. It is well known that foamed plastics are very strong, both in compression and tension, and it is important that a great economy of material is provided by the invention as well as an irrigation distribution system of fine detail. The density of a foam is of the order of one-fifth to one-tenth that of the solid material; thus, the distribution pipe can be economically produced once appropriate machinery has been set up.

The pipe 10 should be sufficiently large in cross-section 13 (the flow section) that the flow within it is large compared with the total effective outward flow cross-section through the walls of the permeable pipe. In this way, a relatively constant pressure can be maintained at all times along the full length of the distribution pipe. The dots 12 indicate the system of interconnecting capillaries and openings in the walls of the pipe. These cavities and openings should preferably be in the form of long continuous capillary tubes, as indicated by the cross-section of the pipe wall.

While it is preferable to have a uniform distribution pipe, as illustrated by FIG. 1, such is by no means mandatory. The pipe of FIG. 1 would undoubtedly be manufactured by means of a continuous extrusion process and would therefore be seamless.

It should be noted that a semi-permeable pipe can be provided even though the tiny cavities are closed by exceptionally thin plastic films. If plastic material is permeable to water in the thin film state, the water will migrate from pore to pore through the thin film walls of the pores, and thence, from inside the pipe to outside. This essentially is the water transport system of fine plastic sponges. Most of the sponge pores are closed but the water passes through the thin pore walls and squeezing the sponge provides a physical force which helps remove the water from the sponge as well as take on additional water when the squeeze is released. In my invention, the applied force is the water pressure maintained in the transport pipe.

Again, it should be noted that the film which closes foamed plastics and tends to render them impermeable to water is the exterior film which is relatively thick; consequently, it is desirable in the construction of the pipe of FIG. 1 that the outer and inner surfaces be scraped after forming has ceased.

It is also clear that porous ceramic pipe can be used in place of porous plastic pipe, the only problem being that ceramics are quite breakable and this would be a disadvantage in large-scale farming operations. As described in the foregoing, porous ceramic media were used in all of the experiments and shown to be well adapted to the irrigation problem at hand. Porous ceramics can be extruded to form pipe of any desirable size and porosity controlled by the materials used and the kiln procedures. To render them impervious to water, most ceramics must be glazed prior to baking in a kiln. To maintain porosity it is often only necessary to eliminate the glaze.

Several forms of permeable, or semi-permeable, distribution pipe having been provided, we turn now to a complete irrigation system as illustrated in FIG. 2. A high pressure input water main 50 connects to a control manifold 66 that is equipped with a turn-on valve 54, a pressure reducing regulator 55 having a calibrated control nut 56, with each turn of the nut representing a certain number of pounds pressure per square inch (p.s.i.). The water flows from input pipe 50 through valve 54, pressure regulator 55, and into output manifold 57, and thence to permeable distribution pipes 58a, 58b, 58c, etc., of circular cross-section and which connect into the distribution manifold 57, as shown. The distribution pipes are buried in the soil 59 below the row of crops as represented by the bushes 60a, 60b, 60c, etc.

When irrigation is to be accomplished, the desired irrigating pressure is set by means of nut 55 and water turned into the system by means of valve 54, the distribution system having appropriately been planted and connected as shown. Whether or not the system is one that is used on a large farm, the grass of an athletic field, the greens of a golf course, or the lawn, trees and shrubs of a home, the basic features and requirements, as illustrated by FIG. 2, are the same. It is assumed that the water supply for the irrigation system, which flows through pipe 50 is taken from a local well, lake, river, stream, reservoir, canal, or municipal water lines.

The broad features of my irrigation system, as well as some important details having been fully covered, we turn now to other critical details. The first of these is the optimum pore size in the permeable plastic or ceramic pipe. To prevent roots from filling the pores of the pipe and/or getting into the interior of the pipe, either or both of which can result in a serious reduction of water flow, it is clear that the pores must be smaller than the smallest plant root, as already noted above. To permit an adequate flow of water from the pipe into the surrounding soil it is also clear that the pores must be larger than the water molecule, $H_2O$; in fact, the pores should preferably be larger than several water molecules in order that the cohesive forces of water come into play. These two limiting dimensions, one on the large end and the other on the small end, fix a range of pore dimensions within which the overall pipe permeability can be optimally controlled. Permeability is a function of both pore size and the number of pores per unit area.

While plant roots are of many different sizes, depending upon the kind of plant, the soil and environment in which the plant is growing, the smallest roots, usually called hair roots, tend to be of a uniform size defined by the basic required cellular structure of the root. I have measured many such roots and found the smallest of them to be of the order of 0.002 inches in cross-section, or approximately 0.005 centimeters equals 50 microns. J. Ben Hill, Lee O Overholts and Henry W. Popp, in Botany, a Textbook for Colleges, Second Edition, third impression, McGraw Hill Book Co., Inc., page 106, give an average diameter for hair roots as being 0.01 millimeters, or 0.001 centimeters=10 microns. Similarly, Bernard S. Meyer and Donald B. Anderson in their book, Plant Physiology, D. Van Nostrand Co., Inc. Second Edition, Ninth Printing, page 235, place the diameter of hair roots at $10\mu$, which is to say, 10 microns. These two references thus fix a hair root diameter at about 5 times smaller than the measurements I made; however, what they define as a hair root, according to Meyer and Anderson, is "a tubular outgrowth of the peripheral wall of an epidermal cell (of the feeder root), closed at its distal extremity, projecting more or less at right angles from the long axis of the epidermal cell of which it is an integral part . . . . They range in length from less than a millimeter to about a centimeter." Thus, what the average layman considers as a hair root is a root considerably longer than the hair roots of the references and very probably is the root from which the reference hair roots issue, or as the references named it: the feeder root. Thus, the hair roots I measured during my experiments with tomato plants were those surrounding and clinging to the porous ceramic cup, and not entering it, as above described. Undoubtedly, these were the roots from which the reference hair roots issue; i.e., the feeder roots. The difference between 10 and 50 microns is thus readily understood;

moreover, my hair roots are of the variety having indefinite lengths and many cross-sectional sizes, from about 50 microns upward. They also are the roots which are capable of passing through a small opening in a pipe carrying water and enlarging on the inside. It is doubted that the hair roots of the references are capable of growth beyond being the kind of hair roots described; and if they did so grow in length, they undoubtedly would also grow in diameter. The upper optimum limit of pore size in my permeable irrigation pipe will, therefore, be fixed at 50 microns for the reasons given.

The diameter of a water molecule, as given in a modern chemistry and physics handbook, or in the Encyclopaedia Britanica, Fifteenth Edition, vol. 19, page and paragraph 633d, and as determined by the Oxygen-Hydrogen bond distance, is 0.96 Angstrom. An Angstrom is $10^{-8}$ centimeters or $10^{-4}$ microns. Putting the above 0.96 Angstroms into round numbers, this dimension becomes 1.0 Angstrom, and allowing for the fact that under the cohesive forces water will best flow in clusters of molecules, I set my lower optimum limit of pore size at a cluster of 10 water molecules wide, or at a limit of 0.001 microns.

Together, these two limiting dimensions provide an optimum range of pore sizes in my irrigation system from 0.001 to 50 microns. This is a range of considerable latitude enabling excellent engineering in the design and manufacture of a subterranean irrigation system.

Figure 3:
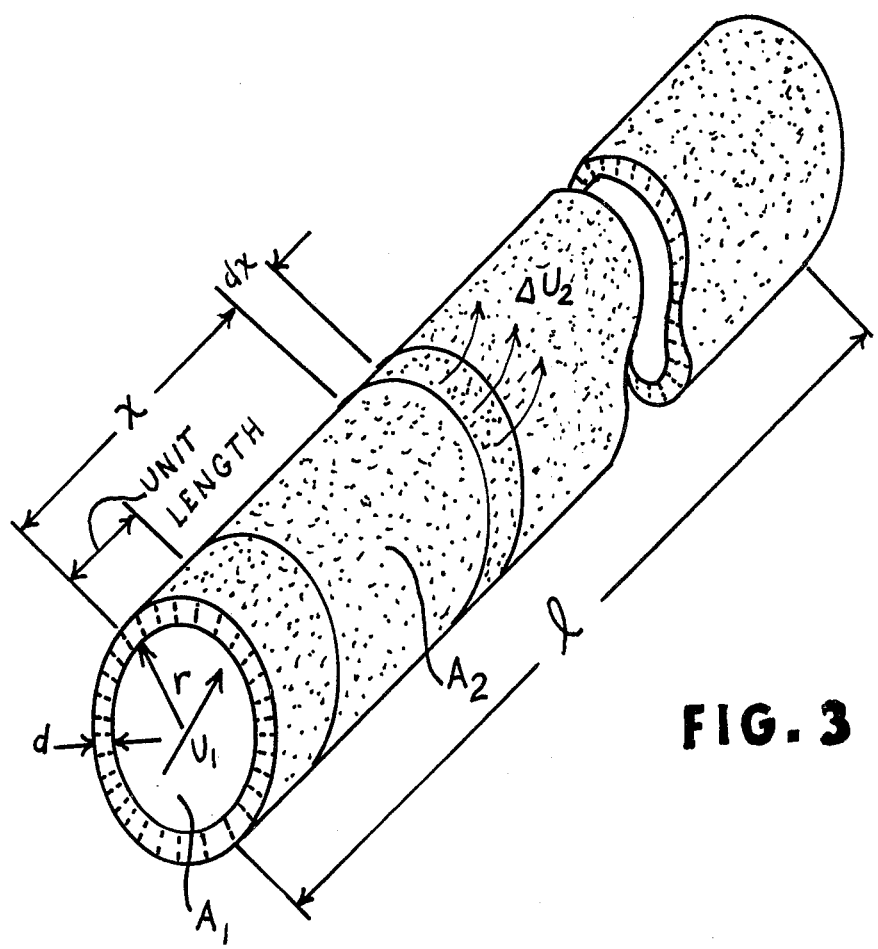
FIG. 3 is a drawing showing a typical section of my porous irrigation pipe that is used in establishing a mathematical description of the pipe's operation.

FIG. 3 is a drawing showing a typical section of my porous irrigation pipe with letter designations defining certain factors used in the mathematical analysis of the flow problem which follows. It is assumed that the flow is sufficiently slow that none of the problems of turbulence, velocity changes with position in the stream, etc., are encountered.

Let the flow area, or flow section of the pipe be circular, uniform throughout, and designated as $A_1$; let r be the radius of this flow section, d the wall thickness of the pipe, and $U_1$ the volumetric flow current. Let $A_2$ represent the surface area of the pipe having a uniform porosity; let the axial length variable be represented by x, a differential of which is dx, and let the total pipe length be l. Let $U_2$ be the leakage volumetric flow current through the wall of the pipe into the soil, and $\Delta U_2$ that fragment which leaks through the band of width dx. If we designate the resistance to flow, $U_1$, through the flow section of the pipe, as R per unit length of pipe, the resistance to flow from positions x to x+dx will be $$Rdx \tag{1}$$

The resistance to leakage flow, $U_2$, through the wall of the pipe, over the same distance, dx, will, however, be inversely related to dx. If also of uniform value, S, per unit length of pipe, this resistance to flow, $U_2$, will be $$S/dx \tag{2}$$

Since $U_1$ is the flow through the pipe, at point x, the leak will be proportional to the rate of change of this current, $dU_1/dx$, and of amount $$-(dU_1/dx)dx \tag{3}$$

This leak is a current which flows through the resistance S/dx, with a fall of pressure p; i.e., the leak flows from internal pressure, p, to zero pressure outside the pipe; hence $$p=(dU_1/dx)dx(S/dx).$$

or $$dU_1/dx = -(p/S) \tag{4}$$

The fall of pressure along the pipe from x to x+dx is $$-(dp/dx)dx \tag{5}$$

so that
$$-(dp/dx)=RU_1 \tag{6}$$

Eliminating $U_1$ from Equations (4) and (6) we get $$\frac{d^2p}{dx^2} - \frac{R}{S} p = 0, \tag{7}$$

the solution of which is known to be $$p = A \operatorname{Cosh} \sqrt{\frac{R}{S}} \, x + B \operatorname{Sinh} \sqrt{\frac{R}{S}} \, x, \tag{8}$$

where A and B are constants to be determined from the boundary conditions.

At the input end of the pipe, x=0, and the applied pressure is $P_{Max}$, so that $$A=P_{Max}. \tag{9}$$

Obviously, if the pressure is to fall as the length of the pipe increases, B must be a negative value. Obviously also, S>>R, and an optimum condition will arise when the total resistance to leakage through the walls of the pipe is equal to the total resistance to flow along the pipe, thus matching the two current flow loads. This occurs for a full pipe length, l, when $$Rl=(S/l). \tag{10}$$

Under this circumstance $$\sqrt{\frac{R}{S}} \, l = \sqrt{\frac{Rl^2}{Rl^2}} = 1 \tag{11}$$

If at this point we let $$\begin{aligned} P_{Min} &= e^{-1} P_{Max} = 0.36788 \, P_{Max} \\ &= P_{Max} \operatorname{Cosh} 1 + B \operatorname{Sinh} 1 \\ 0.36788 \, P_{Max} &= 1.54308 \, P_{Max} + 1.17520 \, B \end{aligned} \tag{12}$$

whence $$B = \frac{-1.54308 + 0.36788}{1.17520} P_{Max} = \frac{-1.17520}{1.17520} = -P_{Max} \tag{13}$$

The equation for pressure along our optimized porous pipe thus becomes $$p = P_{Max} \left[ \operatorname{Cosh} \sqrt{\frac{R}{S}} \, x - \operatorname{Sinh} \sqrt{\frac{R}{S}} \, x \right] \tag{14}$$

Table I evaluates the quantity within the brackets of Eq. (14) for values of the variable $\sqrt{R/S} \, x$ ranging between 0 and 1, thus showing how the pressure along the line decreases in terms of $P_{Max}$ applied at the beginning of the line.

TABLE I
Pressure In Porous Pipe over a range in Length of 1000:1.

| $\sqrt{\frac{R}{S}}\, x$ | $\text{Cosh}\sqrt{\frac{R}{S}}\, x$ | $\text{Sinh}\sqrt{\frac{R}{S}}\, x$ | $\text{Cosh}\sqrt{\frac{R}{S}}\, x - \text{Sinh}\sqrt{\frac{R}{S}}\, x$ |
|---|---|---|---|
| 0.00000 | 1.00000 | 0.00000 | 1.00000 |
| 0.00100 | 1.00000 | 0.00100 | 0.99900 |
| 0.00200 | 1.00000 | 0.00200 | 0.99800 |
| 0.00300 | 1.00000 | 0.00300 | 0.99700 |
| 0.00400 | 1.00001 | 0.00400 | 0.99501 |
| 0.00500 | 1.00001 | 0.00500 | 0.99501 |
| 0.00600 | 1.00002 | 0.00600 | 0.99402 |
| 0.00700 | 1.00002 | 0.00700 | 0.99302 |
| 0.00800 | 1.00003 | 0.00800 | 0.99203 |
| 0.00900 | 1.00004 | 0.00900 | 0.99004 |
| 0.01000 | 1.00005 | 0.01000 | 0.99005 |
| 0.02000 | 1.00020 | 0.02000 | 0.98020 |
| 0.03000 | 1.00045 | 0.03000 | 0.97045 |
| 0.04000 | 1.00080 | 0.04001 | 0.96079 |
| 0.05000 | 1.00125 | 0.05002 | 0.95123 |
| 0.06000 | 1.00180 | 0.06004 | 0.94176 |
| 0.07000 | 1.00245 | 0.07006 | 0.93239 |
| 0.08000 | 1.00320 | 0.08009 | 0.92311 |
| 0.09000 | 1.00405 | 0.09012 | 0.91393 |
| 0.10000 | 1.00500 | 0.10017 | 0.90483 |
| 0.20000 | 1.02007 | 0.20134 | 0.81873 |
| 0.30000 | 1.04534 | 0.30452 | 0.74082 |
| 0.40000 | 1.08107 | 0.41075 | 0.67032 |
| 0.50000 | 1.12763 | 0.52110 | 0.60653 |
| 0.60000 | 1.18547 | 0.63665 | 0.54882 |
| 0.70000 | 1.25517 | 0.75858 | 0.49659 |
| 0.80000 | 1.33743 | 0.88811 | 0.44932 |
| 0.90000 | 1.42209 | 1.02652 | 0.40657 |
| 1.00000 | 1.54308 | 1.17520 | 0.36788 |

As an example in the use of Table I, if R/S is adjusted in pipe design and construction to give 99.9% Max. pressure at a distance of 1 yard from the input end, the pressure at 1,000 yards would be 36.4% of Max. pressure—providing the pipe, and the flow, continue on indefinitely. With the pipe closed at the extreme end, however, there is a discontinuity which hasn't been taken into account. The result is that a wave of pressure is reflected back so that the pressure drop is less than that given in the table.

With the conditions of Eq. (10) imposed, Eq. (14) becomes $$p = P_{Max}\left[\text{Cosh}\frac{x}{l} - \text{Sinh}\frac{x}{l}\right] \quad (15)$$

These conditions fix a relationship between what we might call the resistivities to water flow through the pipe flow section, $\rho$, the resistivity to leakage flow through the wall of the pipe, $\sigma$, the radius of the pipe and the wall thickness, since $$\left.\begin{array}{l} R = \dfrac{\rho\, 1}{\pi r^2} \\[4pt] S = \dfrac{\sigma\, d}{2\pi r l} \end{array}\right\} \quad (16)$$

where the numeral 1 represents unit length, to keep our dimensions straight. Having in the foregoing fixed $$S = R l^2 \quad (10)$$

we get, combining Eq's. (16) and (10)

$$(\sigma d / 2\pi r) = (\rho l^2 / \pi r^2)$$

which yields $$(\sigma/\rho) = (2 l^2 / r d) \quad (17)$$

or $$r = 2\rho l^2 / \sigma d \quad (18)$$

Thus, for a porous pipe of given radius we have the choice of fixing the ratio of $\sigma/\rho$, which in effect fixes the permeability of the pipe walls in terms of its length, radius and wall thickness; alternatively, with the ratio of resistivities given, we have the choices of fixing the pipe radius in terms of its length and wall thickness.

The remaining problem is that of developing some practical flow volumes in terms of units understood by customers as well as by those who ultimately are responsible for the manufacture of the pipe. This was given an experimental basis in the foregoing with respect to tomato plants and the figures will, of course, vary considerably with climatic conditions as well as the type and size of plants being irrigated. It will usually, however, be possible to accommodate all particular problems by providing a reasonable range of pipe porosities and thereafter adjusting the pipe diameter and applied pressure to further meet plant and climatic variations. The porosity of the bottle used to successfully raise a tomato plant over a period of 21 months, as discussed above, will therefore be used as one experimental base in establishing the lower limit in the range of porosities required.

| Experimental Porous Pot Dimensions & Operating Condition Indoors. | |
|---|---|
| Outside Diameter | 1.625 Inches |
| Length | 2.875 Inches |
| Applied Pressure 3 Foot Water Head = | 1.5 p.s.i. |
| Average Daily Water Consumption | ½ Pint plus. |

From these dimensions, operating conditions and measured flow rate, further calculation provides Table II.

TABLE II
Minimum Daily Flow Rates Capable of Sustaining One Small Tomato Plant Indoors By Means of a Porous System Which Kept Roots Out

| Item | English System of Units | Metric System of Units |
|---|---|---|
| Porous Operating Area | 14.667 In² | 94.756 Cm² |
| Flow Per Day Under 1.5 p.s.i. | 8 Fluid Ounces | |
| Flow Per Day Under 1.5 p.s.i. | 14.432 Cu. In. | 236.497 cc |
| Flow Per Day Under 1.0 p.s.i. | 9.621 Cu. In. | 157.665 cc |
| Flow Per Day Under 1 Kg. = 2.2 p.s.i. | | 318.405 cc |
| Flow Per Day Under 1 Kg. per Square Cm. | | 49.405 cc |

Putting these values in round numbers we can reasonably say that a practical porous pipe irrigation system, wherein it was experimentally varified that a plant was sustained indoors over a period of 21 months, and that no roots entered the system, is defined by the minimum daily flow rates of:

10 cubic inches per pound per square inch in pressure;
or
50 cubic centimeters per kilogram per square centimeter pressure.

A similar experiment conducted in my garden out-of-doors, as described in the foregoing, established the following facts:

| Experimental Porous Pot Dimensions & Operating Condition Out-of-Doors | |
| --- | --- |
| Outside Diameter | 1.00 Inch |
| Inside Diameter | 0.75 Inch |
| Length | 3.00 Inch |
| Water Pressure | 8.00 p.s.i. |
| Flow Rate | 1.4 Fluid Oz. per Hour |

From these dimensions, operating conditions and measured flow rates, further calculation provides Table III.

TABLE III

| Maximum Flow Rates Capable of Sustaining One Large Tomato Plant Out-Of-Doors By Means of a Porous System Which Didn't Permit the Entry of Roots. | | |
| --- | --- | --- |
| Item | English System of Units | Metric System of Units |
| Porous Operating Area | 9.425 In$^2$ | 60.809 Cm$^2$ |
| Flow Per Day Under 8 p.s.i. | 33.6 Fluid Ounces | |
| Flow Per Day Under 8 p.s.i. | 60.614 Cu. In. | 993.288 cc |
| Flow Rate Per Day Under 1 p.s.i. | 7.577 Cu. In. | 124.16 cc |
| Flow Rate Per Day Under 1 Kg. = 2.2 p.s.i. | | 215.176 cc |
| Flow Rate Per Day Under 1 Kg. per Cm$^2$ | | 38.93 cc |

Putting these values in round numbers we can reasonably say that a practical porous pipe irrigation system, wherein it was experimentally varified that 12 plants were sustained out-of-doors over three summer months in northeastern Oklahoma, with no roots entering the system, is defined by the maximum daily flow rates of:

61 cubic inches under a pressure of 8 p.s.i., or approximately 7.6 cubic inches per p.s.i.;
or
39 cubic centimeters per kilogram per square centimeter pressure.

Comparing Tables II and III, it is seen that the flow rates per unit of area per unit pressure compare reasonably well and that approximately four times as much water was required to sustain a large tomato plant out-of-doors as was required to sustain a small tomato plant in-doors. With these experimentally derived facts physical limits can be established for the manufacture and operation of my porous pipe irrigation system which are capable of sustaining plant life and keeping roots out. From Table II we can establish the rate of 0.656 (9.621/14.677) cubic inch of water flow per day per square inch of pipe surface per pound of operating pressure; and from Table III we can establish the rate of 0.804 cubic inch (7.577/9.425) of water flow per day per square inch of pipe per pound of operating pressure.

The geometric mean of 0.656 and 0.804 is 0.726; the arithmetic mean is 0.730. In terms of round numbers, a pipe having a uniform porosity over its entire surface and a water flow rate no greater than three-quarters of a cubic inch per day per square inch of surface per pound per square inch pressure is specified as capable of keeping roots out, of supplying adequate water to sustain plant growth at reasonably low pressures as 10 p.s.i., or less, using pipe of a reasonable economic size, such as 1 to 1.5 inches in diameter.

What is claimed is:

1. A water dispenser for the irrigation of plants comprising a porous body having at least:
   a. Two connected surfaces; with
   b. access to the roots of said plants at a first surface;
   c. a conduit connecting a second surface to a controlled water supply and providing a flow of water to said porous body;
   d. said first and second surfaces connected by the pores of said porous body; and wherein
   e. said pores of said porous body are relatively much larger in cross-section than the cross-section of a water molecule and relatively much smaller than the cross-section of the smallest plant feeder root; and wherein
   f. the total water flow cross-section through said porous body, which connects said first and second surfaces, is relatively much smaller than the water flow cross-section of said conduit which connects said second surface to said controlled water supply, and wherein
   g. the largest cross-sectional dimension of any pore in said porous body is larger than one thousandth of a micron and smaller than 50 microns.

2. A water dispenser according to claim 1, comprised of a porous pipe closed at one end and optimally constructed and operating to satisfy the equation $$p = P_{Max}\left[ \text{Cosh}\sqrt{\frac{R}{S}}\, x - \text{Sinh}\sqrt{\frac{R}{S}}\, x \right],$$

where
p is the pressure within the pipe at a distance, x, along the pipe from a point of beginning,
$P_{Max}$ is the water pressure applied to the pipe at the point of beginning,
R is the resistance to water flow per unit length of the flow section, and
S is the resistance to water flow per unit length through the walls of the pipe.

3. A water dispenser according to claim 2, wherein the construction and operation of said pipe satisfies the equation $$p = P_{Max}\left[ \text{Cosh}\frac{x}{l} - \text{Sinh}\frac{x}{l} \right]$$

where p, $P_{Max}$, and x are as defined in claim 2, and where l is the total length of the pipe measured in the same units as x.

4. A water dispenser according to claim 3 wherein the pipe is cylindrical and wherein the ratio of the resistivity to water flow through the flow section of the pipe to the resistivity to water flow through the walls of the pipe is defined by the relation $$\sigma/\rho = (2l^2/rd).$$

where $\rho$ is the resistivity to water flow through the flow section of the pipe, $\sigma$ is the resistivity to water flow through the walls of the pipe, r is the radius of the pipe, l is the total length of the pipe, and d is the wall thickness of the pipe.

5. A water dispenser according to claim 2, wherein a uniform water flow rate through the porous wall of the pipe no greater than three-fourths cubic inch per day per square inch of surface per pound per square inch of applied pressure.

* * * * *